C. DAVIS.
AUTO PULLER.
APPLICATION FILED APR. 22, 1916.

1,229,901.

Patented June 12, 1917.

WITNESSES
Roland T. Williams.
Ross J. Woodward.

INVENTOR
Charles Davis
BY
Richard Bowen
ATTORNEY

UNITED STATES PATENT OFFICE.

CHARLES DAVIS, OF CORTLAND, OHIO.

AUTO-PULLER.

1,229,901. Specification of Letters Patent. Patented June 12, 1917.

Application filed April 22, 1916. Serial No. 92,971.

*To all whom it may concern:*

Be it known that I, CHARLES DAVIS, a citizen of the United States, residing at Cortland, in the county of Trumbull and State of Ohio, have invented certain new and useful Improvements in Auto-Pullers, of which the following is a specification.

This invention relates to an improved wheel chain and the principal object of the invention is to provide a chain so constructed that it may be connected with the rear wheels of an automobile and with a stake driven into the road and the automobile thus extracted from a muddy place in the road or assisting in moving up a steep hill across a slippy section of the road.

Another object of the invention is to so construct the chain that it may be very easily and quickly put in place, it being simply necessary to connect one end of the chain with the rear wheels around the rim and connect the opposite end with a stake driven into the road.

Another object of the invention is to so construct this chain that it may fit wheels of any size.

This invention is illustrated in the accompanying drawings, wherein:—

Figure 1:
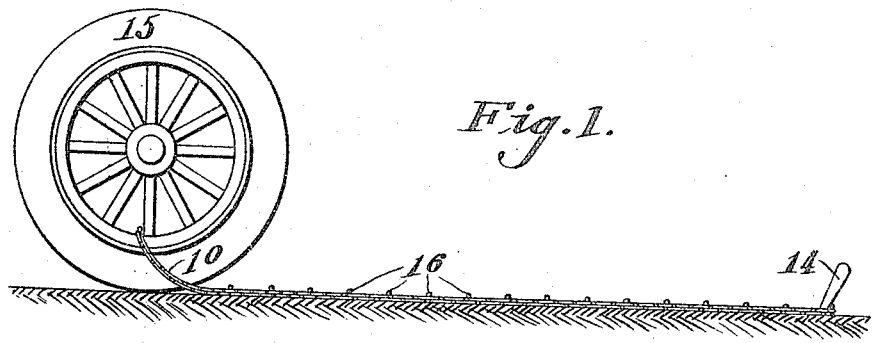
Figure 1 is a view in elevation showing the chain connected with a wheel.
Figure 2:
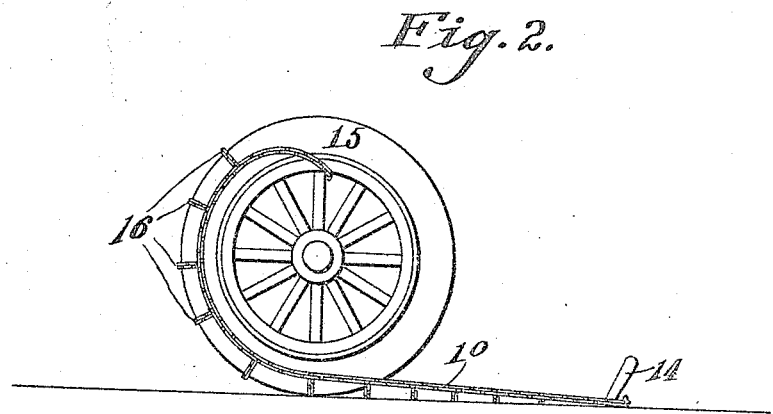
Fig. 2 is a view similar to Fig. 1 showing the manner in which the wheel will ride upon the chain when the chain is in use.
Figure 3:
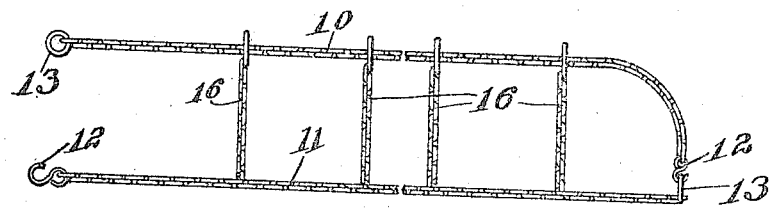
Fig. 3 is a plan view of the chain.

This chain is provided with side sections or chains 10 and 11, each of which is provided at one end with a hook 12 and at the opposite end with a ring 13 therefore the device may have either end connected with the wheel by placing the chains 10 and 11 about the wheel as shown in Fig. 1 with the hook 12 connected with the ring 13. The hook 12 and ring 13 at the opposite end will be connected and the chain can then be connected with the stake 14 which is driven into the roadway. The automobile will then be driven forwardly and as the wheel rotates, the tire 15 will engage the cross chain 16 and the chain will wrap about the tire as shown in Fig. 2. The wheel will therefore ride along the device and will be drawn out of the mud or across the slippy place in the road. If desired a chain could be provided for each rear wheel or a chain could be connected with one rear wheel and after the machine has been moved as far as this chain will permit, a second chain can be connected with the second rear wheel and when the second chain is in place, the stake of the first chain removed and the machine is then drawn forwardly through the action of the second chain. It will thus be seen that with this device an automobile can be easily and quickly drawn out of a muddy portion of the road and it will be further seen that when no longer needed the device can easily be put away until again needed. From an inspection of Fig. 3, it will be seen that the cross chains 16 are provided with large eyes through which the chain 10 passes thereby permitting the chain 10 to be withdrawn and connected with the chain 11 by snapping the hook 12 of one chain into the eye 13 of the second chain. This would provide a towing chain for use in case of a break-down.

What is claimed is:—

1. A track of the character described comprising side chains, cross chains connected with one side chain and provided with eyes through which the second side chain passes. a ring at one end of each of said side chains, and a hook at the opposite end of each of said side chains, said hooks engaging said rings to provide closed ends for the track connecting the track with a wheel and with a ground engaging element when the track is in use, the hook of one side chain engaging the eye of the second side chain to connect the side chains when the second side chain is drawn through the eyes of the cross chains.

2. A track of the character described comprising side chains, means for releasably connecting the end portions of the side chains, and cross chains connected with one of the side chains and provided with eyes through which the second side chain passes.

In testimony whereof I affix my signature in presence of two witnesses.

CHARLES DAVIS.

Witnesses:
ROBERT J. GREENE,
H. M. DAVIS.

Copies of this patent may be obtained for five cents each, by addressing the "Commissioner of Patents, Washington, D. C."